United States Patent Office 3,541,056
Patented Nov. 17, 1970

3,541,056
PROCESS FOR PREPARING BENZAMIDE POLYMERS
Josef Pikl, Glassboro, N.J., assignor to E. I. du Pont de Nemours and Company, Wilmington, Del., a corporation of Delaware
No Drawing. Filed Dec. 28, 1967, Ser. No. 694,067
Int. Cl. C08g 20/20
U.S. Cl. 260—78    12 Claims

ABSTRACT OF THE DISCLOSURE

A process for preparing benzamide polymers by reacting monomers of the formula:

$$HCl \cdot \underset{H}{\underset{|}{N}} - \left( R - \overset{O}{\underset{|}{C}} - \underset{H}{\underset{|}{N}} \right)_n - R' - \overset{O}{\underset{|}{C}} - Cl$$

wherein R and R' are individually selected from the group consisting of:

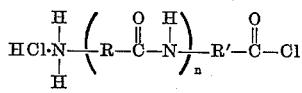

and

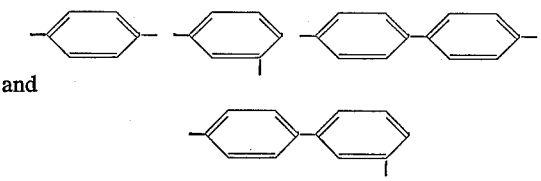

and wherein $n$ is a cardinal number from 1 to 3, preferably together with 0 to 20 mol percent of other monomers.
A reduction in the acidic by-product, compared to prior art monomer processes, is realized.

This invention relates to novel processes for preparing high molecular weight poly(p-benzamide) and poly(m-benzamide), together with polymeric analogues and copolymers thereof. These polyamides may be prepared in the form of dopes which can be extruded, cast, or fibridated into useful articles such as fibers and films.

BACKGROUND OF THE INVENTION

Processes for the preparation of poly(m-benzamide), also dentified as poly(1,3-benzamide) have been described in Stephens Br. 901,159 and in Huffman et al. U.S. 3,203,933. Low temperature polymerizaation processes shown therein utilize a salt of a m-aminobenzoyl halide in conjunction with an acid-neutralizing agent or an acid acceptor (e.g., sodium carbonate, pyridine) to remove the acidic by-product of the polymerization. According to Huffman et al., the acid acceptor is employed in an amount in excess of the theoretical amount needed to neutralize any acid formed during the reaction. Preston and Smith U.S. 3,225,011 describes a slurry polymerization process for preparation of a poly(p-benzamide), or poly(1,4-benzamide), from, e.g., p-aminobenzoyl chloride hydrochloride, using a tertiary amine proton acceptor (e.g., pyridine) to neutralize the acidic by-product of the reaction. In each of the above-cited processes, two equivalents of acidic by-product are produced per amide linkage formed in the polymer or copolymer. The present invention permits preparation of the above-described polyamides, together with copolymers and polymeric analogues thereof, by processes which require significantly less acid-neutralizing agent than do prior art techniques.

SUMMARY OF THE INVENTION

This invention provides high molecular weight, film- and fiber-forming poly(p-benzamide) and poly(m-benzamide), together with polymeric analogues and copolymers thereof, by polymerizations of difunctional multi-ring monomers. These polymerizations are accomplished by processes which utilize no more than one equivalent of acid acceptor or acid neutralizing agent to neutralize the acidic by-product of the polymerization, per amide linkage in the polymeric product.

The useful polymers and copolymers obtained by the process of this invention are prepared from reaction mixtures comprising a suitable amide medium which is a solvent for the monomer; preferably containing lithium chloride; at least one of the aforesaid multi-ring monomers; and suitable copolymerizable comonomers (if desired). Mono- and multi-functional chain terminating agents may be added to the reaction mixture when desired. A specified amount of lithium chloride is preferably added to the reaction mixture. The mixture is maintained between about 5 to 30° C. for from about 1 hr. to 4 hrs. to accomplish desired degree of polymerization. The reaction mixture is then preferably neutralized with an inorganic base selected from the group consisting of lithium carbonate, lithium hydroxide, lithium oxide, and calcium hydroxide. If the resulting polymeric composition is not directly formed into shaped articles, such as fibers and films, the polymeric product may be isolated by, e.g., agitating the composition with a suitable polymer nonsolvent, e.g., water.

DESCRIPTION OF THE PREFERRED EMBODIMENTS

Monomer preparation

In performing the polymerizations of this invention, there are utilized novel multi-ring di-functional monomers of the formula:

(I)    $HCl \cdot H_2N(RCONH)_nR'COCl$ wherein $n$ is a cardinal number from 1–3 and R and R' individually may have one of the following structural formulas:

and

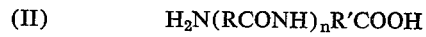

Monomers of Formula I may be prepared by treating compounds of the formula:

(II)    $H_2N(RCONH)_nR'COOH$ with thionyl chloride and anydrous hydrogen chloride by the general procedure described by Graf and Langer in J. prakt. Chem. 148, 161–169 (1937).
Application of the latter procedure, occasionally modified to the extent that an excess of toluene is used as a diluent in the reaction, first produces thionylaminobenzoyl chloride compounds of the formula:

(III)    $O{=}S{=}N{-}(RCONH)_nR'COCl$ wherein R, R' and $n$ have the significance set forth hereinbefore, which may be converted to Formula I monomers by reaction with anhydrous hydrogen chloride, as disclosed by Graf and Langer, ibid.
Among the useful Formula II compounds whose Formula III chlorocarbonyl hydrochlorides are prepared may be named 4-[4'-aminobenzamido]benzoic acid, 4-[3'-aminobenzamido[benzoic acid, 3-[4'-aminobenzamido] benzoic acid, 3 - 3' - aminobenzamido]benzoic acid, tri-[4-aminobenzoic acid]peptide, and tetra-[4-aminobenzoic amide]peptide whose preparations are shown by Brederreck and von Schuh in Chem. Ber . 81, 215–221 (1948).

POLYMERIZATIONS AND POLYMERIZATION CONDITIONS

In accordance with this invention, there are provided processes for preparing high molecular weight, fiber- and film-forming polyamides comprising recurring structural units of the formula:

(IV)            [NH(RCONH)$_n$R′CO]

wherein R, R′, and $n$ have the significance set forth hereinbefore, and having an inherent viscosity of from 0.8 to 3.0 or greater (measured as described hereinafter). These polyamides preferably contain 0 to 20 mol percent of recurring units selected from the group consisting of:

(V)            $-(NH-Q-NH)-$ (VI)           $-(CO-Q'-CO)-$ and (VII)          $-(NH-Q''-CO)-$ wherein Q, Q′, and Q″, which may be the same or different, are divalent organic radicals comprising at least one carbocyclic ring possessing benzenoid unsaturation. It is apparent that these polyamides comprise at least two adjacent self-contained carbonamide units (i.e., from the Formula IV portion). In these polyamides the Formula V and Formula VI units are present in substantially equal molar amounts and preferably constitute up to about 10 mol percent each. These polyamides may be prepared from a major portion of a Formula I salt copolymerized with substantially equal molar amounts of comonomers furnishing Formula V and Formula VI units and/or comonomers furnishing Formula VII.

As suitable sources of Formula V units may be mentioned aromatic diamines of the formula:

(VIII)         H$_2$N—Q—NH$_2$ wherein Q has the significance previously given. Among the useful Formula VIII diamines may be mentioned p-phenylene-diamine, m-phenylenediamine, benzidine, 4-methyl - m-phenylene-diamine, 2,6-dichloro-p-phenylene-diamine, 4,4′-diaminodiphenyl-methane, 4,4′-diaminodiphenylpropane, 4,4′-diaminodiphenyl ether, 4,4′-diaminodiphenyl sulfone.

Formula VI units may be provided by aromatic diacid derivatives of the formula:

(IX)          $X-\overset{O}{\underset{\|}{C}}-Q'-\overset{O}{\underset{\|}{C}}-X$ wherein Q′ has the significance set forth hereinbefore and wherein X is chlorine or bromine. These derivatives may be prepared from aromatic diacids such as isophthalic, terephthalic, 2,5-dichloroterephthalic, 5-chloroisophthalic, and 4,4′-bibenzoic. The appropriate diacid chlorides, preparable by conventional procedures, are preferred; diacid bromides are also suitable.

Formula VII units may be provided by aromatic aminocarboxyl halide salts of the formula:

(X)          $HX \cdot H_2N-Q''-\overset{O}{\underset{\|}{C}}-X$ wherein Q″ has the significance set forth hereinbefore (preferably m- or p-phenylene) and wherein X is chlorine or bromine. Among the useful Formula X comonomers are p- and m-aminobenzoyl chloride hydrochloride, p- and m-aminobenzoyl bromide hydrochloride, etc.

The polyamides preparable by the process of this invention may be formed by reacting one or more Formula I monomers with one or more Formula VIII comonomers, one or more Formula IX comonomers, and one or more Formula X comonomers according to the procedure described for the preparation of the Formula IV polyamides.

Chain terminators may be used in these polymerizations to assist in control of the molecular weights of the products. Among the suitable chain terminators are monofunctional compounds which can react with the acid chloride ends of these polyamides such as ammonia, monoamines (e.g., ethylamine, dimethylamine, diethylamine, butylamine, dibutylamine, cyclohexylamine, aniline, etc.), compounds containing a single amide-forming group such as N,N-diethylethylenediamine, hydroxylic compounds such as methyl alcohol, ethyl alcohol, isopropyl alcohol, phenol, water, etc., monofunctional compounds which can react with the amine ends of the polyamides such as other acid chlorides (e.g., acetyl chloride, benzoyl chloride, and the like), ethyl chloroformate. Terephthaloyl chloride and isophthaloyl chloride are useful also.

The Formula I monomers, and any Formula VIII, IX, and X monomers, are dispersed in a suitable monomer solvent, e.g., N,N,N′,N′-tetramethylurea; 1,3-dimethylimidazolidinone-2; N-methylpiperidone-2; N-methylcaprolactam; N,N-dimethylpropionamide; N,N-dimethylbutyramide; N,N-dimethylisobutyramide; hexamethylphosphoramide; N-methylpiperidone-2; N,N-dimethylacetamide; N - methylpyrrolidone - 2; N-ethylpyrrolidone-2; N,N-diethylacetamide; N,N,N′,N′-tetramethylmalonamide; and the like, or mixtures thereof. These reaction mixtures preferably contain from 1 to 10% dissolved lithium chloride, 1 to 3% being most preferred, and are prepared preferably with agitation and under an anhydrous inert atmosphere, e.g., dry nitrogen. The resulting mixture is preferably stirred 1–4 hrs. at from 5 to 30° C. The initial presence of this lithium chloride assists in maintaining the fluidity of the system during the polymerization.

A neutralizing agent such as lithium carbonate, lithium hydroxide, lithium oxide or calcium hydroxide is preferably added to the reaction mixture in the amount necessary to effect neutralization of the acidic by-product. This neutralization is highly desirable for several reasons. Firstly, the acid may cause significant corrosion problems in processing equipment (e.g. the spinneret). Secondly, it is seen that the presence of acid may inhibit formation of higher molecular weight polymer (e.g. inherent viscosity greater than about 1.4 to 2.0).

The use of the monomers of this invention, e.g., 4-(4′-aminobenzamido)benzoyl chloride hydrochloride instead of those of the prior art, e.g. p-aminobenzoyl chloride hydrochloride, to prepare neutralized spin dopes of benzamide polymers presents a significant economic advantage in the reduced amount of base (e.g. lithium hydroxide) required to neutralize the acidic by-product of the polymerization. A second significant advantage arises from the fact that spin dopes of poly(p-benzamide) in tetramethylurea, whose inherent viscosity is 1.5 or higher, may be prepared by this invention under conditions wherein the reaction mixture remains fluid and readily stirrable during and after the neutralization. In contrast to this behavior, such spin dopes prepared from p-aminobenzoyl chloride hydrochloride and neutralized with lithium hydroxide usually become very difficult to stir when the inherent viscosity of the polymer is about 1.5 or higher. Under the latter circumstances, the thick semi-solid mass produced requires additional treatment before a spin dope is obtained. This treatment may require prolonged heating and vigorous stirring of the thick mass and the addition of a solubilizing medium (e.g., tetramethylurea). The addition of lithium chloride at the start of a polymerization may assist in maintaining a fluid reaction mixture. However, lithium chloride added in this manner, in addition to that resulting from neutralization, may result in a large excess of salt in the spin dope. Removal of this excess salt from the shaped structures formed thereof constitutes a further economic disadvantage which is significant in processes using the prior art monomer.

Dopes of the polyamides and copolyamides prepared by this invention can be cast into self-supporting films, extruded into fibers by conventional procedures (both wet and dry spinning methods may be employed) or formed into fibrids by shear-precipitation techniques (e.g., as described in Morgan U.S. 2,999,788). The dopes can be used as liquid coating compositions which are applied to a variety of substrates which may be in the form of sheets, papers, wires, string, fibers, solid or microporous objects, etc.

When some amide media, such as tetramethylurea, N,N-dimethylacetamide, N,N-dimethylisobutyramide, or 1,3-dimethylimidazolidinone-2, are employed in the polymerization, the contents of the reaction vessel may be in the form of a viscous dope which can be directly formed into shaped articles (e.g. extruded into fibers or cast into films). Under these conditions, use of calcium hydroxide as a neutralizing agent is limited to N,N-dimethylacetamide dopes. It is generally preferred to further stir the contents of the reaction vessel, after neutralization, for about 0.5 to 2 hrs., at from 45 to 170° C., when the solvent is tetramethylurea. When the solvent is 1,3-dimethylimidazolidinone-2, N,N-dimethylisobutyramide or N,N-dimethylacetamide, it is preferred to further stir the contents of the reaction vessel, after neutralization for about 1 hr. at about 100 to 110° C.

If desired, the polymeric product may be isolated from any of the above-described reaction mixtures by agitating the mixture with a nonsolvent for the polymer, e.g. water. The isolated product may be redissolved by placing it in a suitable amide medium, preferably tetramethylurea or dimethylacetamide containing from 2 to 15% lithium chloride, stirring the resulting mixture until a solution of the desired viscosity results and then formed into a shaped article.

EXAMPLES

The following non-limiting examples are illustrative of the practice of the preferred embodiments of this invention. In these examples, inherent viscosity ($\eta_{inh}$) has been determined in accordance with the following equation $$\eta_{inh} = \frac{\ln(\eta_{rel})}{C}$$

wherein ($\eta_{rel}$) represents the relative viscosity, (C) represents a concentration of 0.5 gram of the polymer in 100 ml. of the solvent. The relative viscosity ($\eta_{rel}$) is determined by dividing the flow time in a capillary viscometer of a dilute solution of the polymer by the flow time for the pure solvent. The dilute solution used herein for determining ($\eta_{rel}$) are of the concentration expressed by (C) above; flow times are determined at 30° C., using concentrated (95–98%) sulfuric acid as a solvent.

Fiber properties of tenacity, elongation, and initial modulus are coded as T/E/Mi and are in units of grams/denier, percent, and grams/denier, respectively. Parts and percentages are by weight unless otherwise indicated.

Example 1

This example illustrates the preparation of poly (p-benzamide) by the process of this invention without neutralization of the acidic by-product of the reaction.

A reaction mixture comprising 1.5 g. (0.0048 mole) of 4-(4'-aminobenzamido)benzoyl chloride hydrochloride and 10 ml. of tetramethylurea containing 2% lithium chloride is prepared and permitted to stand at room temperature overnight. The reaction mixture (very viscous) is agitated with water in a Waring Blendor, the polymer isolated, washed three times with water and once with isopropyl alcohol, and dried. The inherent viscosity of the polyamide is 0.85.

Example 2

This example illustrates the preparation of poly (p-benzamide) by the process of this invention, using lithium hydroxide to neutralize the acidic by-product.

To 80 ml. of tetramethylurea, iced, is added 4-(4'-aminobenzamido) benzoyl chloride hydrochloride (15 g., 0.048 mole). The cooling bath is removed after 0.5 hr. and the reaction mixture is stirred for approximately 3 hrs. Lithium hydroxide (2.3 g., 0.096 mole) is then added with stirring and the contents of the reaction vessel are permitted to stand at autogenous temperature for about 15 hrs. The reaction mixture is poured into water, the polymeric product isolated, washed, and dried to yield poly(p-benzamide), $\eta_{inh}$=0.84.

Example 3

This example illustrates the preparation of a film and a fiber from a dope of the polymer prepared in Example 2.

A spinning dope is prepared from 11.48 g. of poly (p-benzamide) from Example 2 and 97 ml. of tetramethylurea, containing 6 g. of lithium chloride, by stirring the combined ingredients overnight at room temperature. Films are wet-cast on Teflon® plates from the resulting viscous dope. The films are twice washed 10 minutes in water, then pressed for 5 minutes at 150° C. at a pressure of about 100 lbs. per square inch.

Fibers are prepared from the above-described viscous dope by extruding it through a spinneret into a bath of warm water. The fibers are collected, washed with water, and dried. They exhibit the following tensile properties: T/E/Mi: 2.8/2.6/230.

Example 4

This example further illustrates the preparation of poly(p-benzamide) and fibers thereof from the fluid dope obtained by the process of this invention.

Anhydrous tetramethylurea (500 ml.) is chilled to 5° C. in a 1 liter resin kettle (dried by flaming; filled with dry nitrogen; equipped with a basket-type stirrer; drying tube, and nitrogen inlet; and immersed in an ice-water bath). 4 - (4' - Aminobenzamido)benzoyl chloride hydrochloride (50 g., 0.16 mole) is added all at once with vigorous stirring. The cooling bath is removed after 0.5 hr. and the stirring action is slowed to about 60 r.p.m. After these ingredients are stirred 3 hrs. at ambient temperature, anhydrous lithium hydroxide (7.68 g., 0.32 mole) is added with vigorous stirring. After being stirred for 0.1 hr., the resultant mixture is heated to 125° C. in an oil bath to give a fluid dope (takes 0.5 hr. of heating). A sample of poly(1,4-benzamide), isolated from the dope by precipitation in a blendor with water and washed twice with water and once with alcohol and dried 10 hrs. at 80° C. exhibits an inherent viscosity in excess of 1. Strong fibers are prepared by extruding the hot dope through a 100-hole spinneret, each hole 0.003 inch in diameter, at 40 p.s.i. pressure into a 60° C. water bath 6 feet in length; the fibers are wound up at 100 ft./min. After trese fibers are passed at 12 ft./min. through a concentric nitrogen-filled tube having a 3-inch heated zone (535° C.) and after having been drawn 1.02×, their tensile properties are enhanced.

Example 5

This example illustrates the preparation of copoly [bis(p-benzamide)/p-phenylenediamine terephthalamide] and fibers thereof by the process of this invention.

To p-phenylenediamine (4.0 g., 0.037 mole) in tetramethylurea (400 ml.), stirred over ice, is added an intimate mixture of 4-(4'-aminobenzamido)benzoyl chloride hydrochloride (35.0 g., 0.112 mole) and terephthaloyl chloride (7.5 g., 0.037 mole). The cooling bath is removed after 0.5 hr. and the polymerization mixture is further stirred for 3 hrs., after which lithium hydroxide (7.2 g., 0.3 mole) is added. This mixture is stirred 0.1 hr. before being heated to 120° C. A sample of the copolymer, isolated as shown above, exhibits an inherent viscosity greater than 1. Fibers are prepared by extruding the dope into a 200° C. nitrogen atmosphere. After being soaked 24 hrs. in water, then dried, the fibers exhibit high levels of tensile properties. These properties are enhanced by drawing the fibers 1.02× through a tube at 530° C. (contact time 0.3 sec.) under nitrogen.

Example 6

This example illustrates the preparation of copoly [bis(p-benzamide)/m-benzamide] by the process of this invention.

To dimethylacetamide (500 ml.), stirred over ice, is added an intimate mixture of 4-(4'-aminobenzamido) benzoyl chloride hydrochloride (45 g., 0.14 mole) and 3-aminobenzoyl chloride hydrochloride (5.0 g., 0.026 mole). The cooling bath is removed after 0.5 hr. and the polymerization mixture stirred for 3 hrs. Lithium hydroxide (7.9 g., 0.33 mole) is added and the mixture is stirred 0.1 hr. before being heated to 120° C. A sample of isolated copolymer has an inherent viscosity greater than 1. Fibers are prepared by extruding the hot dope into a column purged with nitrogen at 200° C. These fibers, after being soaked 24 hrs. in water and dried, exhibit excellent tensile properties which are improved by drawing the fibers 1.2× under nitrogen through a tube maintained at 480° C.

Example 7

This example illustrates a preparation of a poly (p-benzamide) spin dope from the prior art monomer, p-aminobenzoyl chloride hydrochloride, characterized by the formtion of a difficultly stirrable mass in the reaction vessel (polymer's $\eta_{inh}=1.8$).

To 3.0 l. of N,N,N',N'-tetramethylurea, chilled to 0°, are added 308 g. of p-aminobenzoyl chloride hydrochloride. The combined ingredients are stirred at autogenous temperature for 2.5 hrs, after which lithium hydroxide (71 g.) is added (a sample of polymer isolated just prior to addition of the base has an inherent viscosity 1.6). The mixture is stirred vigorously and, after three minutes, heat is applied until the internal temperature is 140°. The mixture sets up to a stiff gel which is difficult to stir. Continued stirring and heating for up to 5 hrs., do, however, convert the mixture into a homogenous, fluid dope which is spun into strong fibers. The solution remains fluid above about 100° but gels below this temperature. Such a gel can be reconverted into a fluid by further heating and stirring, but it is preferable from the point of view of spinnability to maintain the solution in a fluid form prior to spinning.

In a similar example, in which a polymer having an inherent viscosity of 1.4 is prepared, no undue stirring difficulty results.

Example 8

This example illustrates that a fluid spin dope comprising high viscosity poly(p-benzamide) is readily obtained by using 4-(4'-aminobenzamido)benzoyl chloride hydrochloride in the process of this invention.

To a solution of lithium chloride (14.2 g., 0.335 mole) in tetramethylurea (500 ml.), stirred over ice, is added 4-(4'-aminobenzamido)benzoyl chloride hydrochloride (50 g., 0.16 mole). The cooling bath is removed after 0.5 hr. and the reaction mixture stirred for 3 hrs. Lithium hydroxide (7.68 g., 0.32 mole) is added and the mixture stirred for 0.1 hr. before being externally heated (120° C. oil bath). After stirring is continued for 0.5 hr., during which time the mixture remains fluid, a dope suitable for wet-spinning is obtained. A sample of isolated polymer has an inherent viscosity in the region above 1.5.

What is claimed is:

1. A process for the preparation of benzamide polymer comprising recurring structural units of the formula $$\{NH(RCONH)_nR'CO\}$$

wherein R and $R_2$ are individually selected from the group consisting of:

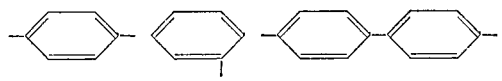

and

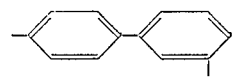

and wherein $n$ is a cardinal number from 1 to 3, said benzamide polymer having an inherent viscosity of from about 0.8 to about 3.0, as measured in concentrated sulfuric acid at 30° C., at a concentration of 0.5 gram of polymer in 100 ml. of solvent, comprising reacting at least 80 mol percent of monomer of the formula:

(I) 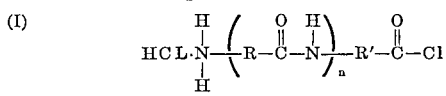

wherein R, R' and $n$ are as defined above, and 0 to 20 mol percent of monomer selected from the group consisting of:

(II) 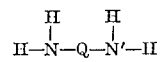

(III) 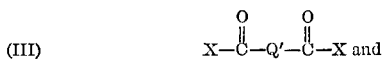

(IV) 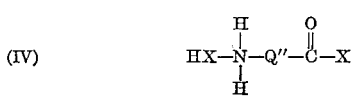

wherein Q, Q' and Q'' are divalent organic radicals comprising at least one carbocyclic ring possessing benzenoid unsaturation, and X is selected from the group consisting of chlorine and bromine, said monomers being dispersed in an amide medium which is a solvent for the monomers being reacted.

2. The process of claim 1 wherein said monomers are 100 mol percent of monomers according to Formula I.

3. The process of claim 1 wherein the reaction mixture is stirred for about 1 to 4 hours at about 5 to 30° C. under an anhydrous inert atmosphere.

4. The process of claim 1 wherein said amide media contains about 1 to 10% by weight of lithium chloride dissolved therein, said weight percent being based upon the weight of the reaction system.

5. The process of claim 1 wherein said monomer according to Formula I is 4-(4'-aminobenzamido) benzoyl chloride hydrochloride.

6. The process of claim 1 wherein said amide media is substantially anhydrous and comprises at least one amide selected from the group consisting of:

N,N,N',N'-tetramethylurea,
1,3-dimethylimidazolidinone-2,
N-methylpiperidone-2,
N-dimethylbutyramide,
N,N-dimethylisobutyramide,
hexamethylphosphoramide,
N-methylpiperidone-2,
N,N-dimethylacetamide, and
N,N,N',N'-tetramethylmalonamide.

7. The process of claim 1 further comprising, adding to the reaction mixture one equivalent, per amide linkage formed in the resulting benzamide polymer, of a compound selected from the group consisting of:

lithium hydroxide,
lithium oxide, and
lithium carbonate.
     to neutralize the acidic by-product of the reaction.

8. The process of claim 1 further comprising adding one equivalent, per amide linkage formed in the resulting benzamide polymer, of calcium hydroxide to the reaction mixture to neutralize the acidic by-product of the reaction.

9. The process of claim 7 wherein said amide media comprises at least one amide selected from the group consisting of N,N,N',N'-tetramethylurea, N,N-dimethylacetamide, N,N-dimethylisobutyramide, and 1,3-dimethylimidazolidinone-2 and wherein X is chlorine, said process further comprising stirring the neutralized reaction mixture to produce a viscous dope, and forming a shaped article thereof.

10. The process of claim 1 further comprising isolating the polymeric reaction product and thereafter dissolving the said product in a suitable amide solvent containing about 2 to 15% by weight of lithium chloride, said weight percent based upon the weight of the dissolved system.

11. The process of claim 10 wherein said amide solvent is N,N,N',N'-tetramethylurea.

12. The process of claim 1 wherein said inherent viscosity is at least about 1.5.

References Cited

UNITED STATES PATENTS 3,225,011   12/1965   Preston et al.

OTHER REFERENCES

Defensive Publication (Ser. No. 690,057), Michel, pub. January 1969, filed Dec. 13, 1967, "Poly[4-(4'-phenoxy benzamide) and Solutions, and Shaped Article Made Therefrom."

WILLIAM SHORT, Primary Examiner

E. WOODBERRY, Assistant Examiner

U.S. Cl. X.R.

260—32.6

UNITED STATES PATENT OFFICE
CERTIFICATE OF CORRECTION

Patent No. 3,541,056              Dated November 17, 1970

Inventor(s) Josef Pikl

It is certified that error appears in the above-identified patent and that said Letters Patent are hereby corrected as shown below:

Column 7, line 70, Claim 1, "$R_2$" should read -- $R'$ --. Column 8, line 20, formula (II) reading $$H-\overset{H}{\underset{|}{N}}-Q-\overset{H}{\underset{|}{N'}}-H \quad \text{should read} \quad H-\overset{H}{\underset{|}{N}}-Q-\overset{H}{\underset{|}{N}}-H$$

Signed and sealed this 10th day of August 1971.

(SEAL)
Attest:

EDWARD M. FLETCHER, JR.                WILLIAM E. SCHUYLER, JR.
Attesting Officer                      Commissioner of Patents

PO-1050
(5/69)

UNITED STATES PATENT OFFICE
CERTIFICATE OF CORRECTION

Patent No. 3,541,056　　　　　　Dated November 17, 1970

Inventor(s) Josef Pikl

It is certified that error appears in the above-identified patent and that said Letters Patent are hereby corrected as shown below:

Column 8, lines 11-14, Claim 1, formula (I), the portion of the formula reading:

$$\text{HCL} \cdot \underset{H}{\overset{H}{N}}-$$

should read $$\text{HCl} \cdot \underset{H}{\overset{H}{N}}-$$

Signed and sealed this 14th day of December 1971.

(SEAL)
Attest:

EDWARD M. FLETCHER, JR.　　　　ROBERT GOTTSCHALK
Attesting Officer　　　　　　　　Acting Commissioner of Patents